(12) United States Patent
Ge

(10) Patent No.: US 10,892,461 B2
(45) Date of Patent: Jan. 12, 2021

(54) BUSBAR WITH INSULATION COATING FOR NEW ENERGY AUTOMOBILE

(71) Applicant: SHANGHAI VEKAN PRECISION INDUSTRY CO., LTD, Shanghai (CN)

(72) Inventor: Yangbo Ge, Shanghai (CN)

(73) Assignee: SHANGHAI VEKAN PRECISION INDUSTRY CO., LTD., Shanghai (CN)

(*) Notice: Subject to any disclaimer, the term of this patent is extended or adjusted under 35 U.S.C. 154(b) by 231 days.

(21) Appl. No.: 16/119,869

(22) Filed: Aug. 31, 2018

(65) Prior Publication Data

US 2020/0075912 A1     Mar. 5, 2020

(51) Int. Cl.
| | |
|---|---|
| *H01M 2/26* | (2006.01) |
| *H01M 2/20* | (2006.01) |
| *H01B 3/14* | (2006.01) |
| *H01B 3/46* | (2006.01) |
| *H01B 3/44* | (2006.01) |
| *H01B 3/12* | (2006.01) |
| *B60L 50/64* | (2019.01) |

(52) U.S. Cl.
CPC .............. *H01M 2/206* (2013.01); *H01B 3/12* (2013.01); *H01B 3/14* (2013.01); *H01B 3/448* (2013.01); *H01B 3/465* (2013.01); *B60L 50/64* (2019.02)

(58) Field of Classification Search
CPC ...... H01M 2/206; H01M 2/208; H01M 2/202; H01M 2/204; H01M 2/26; H01B 3/12; H01B 3/14; H01B 3/448; H01B 3/465; B60L 50/64

See application file for complete search history.

(56) References Cited

U.S. PATENT DOCUMENTS

| | | | | |
|---|---|---|---|---|
| 4,317,277 | A | * | 3/1982 | Bennett ............... B23K 11/163 174/94 R |
| 4,443,652 | A | * | 4/1984 | Izu ....................... H01L 31/076 136/244 |
| 2016/0315305 | A1 | * | 10/2016 | Wintner ............... H01M 2/206 |
| 2017/0256770 | A1 | * | 9/2017 | Wynn .................. H01M 2/206 |

* cited by examiner

*Primary Examiner* — Raymond Alejandro

(74) *Attorney, Agent, or Firm* — Anova Law Group, PLLC

(57) ABSTRACT

A busbar with an insulation coating for a new energy automobile comprises a busbar body and a high-temperature-resistant insulating layer sprayed on the busbar body, and a raw material formula of the high-temperature-resistant insulating layer comprises 3~12% of high aluminum cement, 3~9% of attapulgite clay, 3~9% of porcelain clay, 2~5% of titanium dioxide, 2~6% of multi-walled carbon nanotubes, 2~6% of boron phosphate, 2~5% of n-methylol acrylamide, 3~9% of aluminum dihydrogen phosphate, 3~7% of tri-block copolymer styrene-butzdiene-methyl methacrylate, 3~7% of methylphenyl silicone resin, 3~7% of vinyl silicone oil, 10~19% of polyvinyl acetate emulsion and balance of deionized water. The busbar of the present invention has good high temperature resistant performance and insulating performance.

5 Claims, No Drawings

BUSBAR WITH INSULATION COATING FOR NEW ENERGY AUTOMOBILE

TECHNICAL FIELD

The present invention relates to a busbar with an insulation coating for a new energy automobile, and belongs to the technical field of new energy automobiles.

BACKGROUND

The automobile industry is an important pillar industry in national economic and social development in China. In recent years, the sales quantity and the ownership quantity of automobiles in China are rapidly developed along with the rapid economic growth and continuous acceleration of the urbanization process, and China has become the largest country of production and sales quantity of the automobiles in the world. However, China is not the strongest country. To enable China to become a strong automobile country, the only way which must be passed is to develop the new energy automobiles. From the beginning of popularization to the year before 2013, the industry of the new energy automobiles is always at an ordinary state. Since a market failure phenomenon exists in characteristics and development of the industry of the new energy automobiles, all countries in the world, especially relatively developed countries, promulgate a series of industrial policies in order to accelerate and promote the industry of the new energy automobiles to enter an implementary production stage, so as to guide and support healthy and rapid growth of the industry of the new energy automobiles. As a series of policies are promulgated and implemented, the new energy automobiles will further promote economic and social development of China.

A busbar is an important material to be used in the new energy automobiles. The material of the existing busbar cannot achieve the requirement of the new energy automobiles. Therefore, it is necessary to design a busbar with an insulation coating for a new energy automobile.

SUMMARY

The purpose of the present invention is to provide a busbar for a new energy automobile.

To achieve the above purpose, the technical solution adopted in the present invention is as follows: a busbar with an insulation coating for a new energy automobile comprises a busbar body and a high-temperature-resistant insulating layer sprayed on the busbar body, and a raw material formula of the high-temperature-resistant insulating layer comprises the following materials in mass percent:

| | |
|---|---|
| high aluminum cement | 3~12%; |
| attapulgite clay | 3~9%; |
| porcelain clay | 3~9%; |
| titanium dioxide | 2~5%; |
| multi-walled carbon nanotubes | 2~6%; |
| boron phosphate | 2~6%; |
| n-methylol acrylamide | 2~5%; |
| aluminum dihydrogen phosphate | 3~9%; |
| tri-block copolymer styrene-butzdiene-methyl methacrylate | 3~7%; |
| methylphenyl silicone resin | 3~7%; |
| vinyl silicone oil | 3~7%; |
| polyvinyl acetate emulsion | 10~19%; |
| deionized water | balance. |

A preferred technical solution is as follows: the thickness of the busbar body is less than or equal to 12.5 mm; the cross-sectional area of the busbar is less than or equal to 38 cm³.

A preferred technical solution is as follows: the density of the busbar is 2.7 g/cm³.

A preferred technical solution is as follows: the thermal conductivity of the busbar at 25° C. is 218 W/(m·K).

A preferred technical solution is as follows: the conductivity of the busbar is greater than or equal to 57% IACS.

A preferred technical solution is as follows: the solid content in the raw material formula of the high-temperature-resistant insulating layer is less than or equal to 60%.

Since the above-mentioned technical solution is used, the present invention has the following advantages and effects compared with the prior art:

1. The busbar of the present invention can reduce the cost, reduce automobile weight and increase energy utilization rate.

2. The busbar of the present invention has good high temperature resistant performance and insulating performance.

DETAILED DESCRIPTION

The present invention is further described below in combination with embodiments:

Embodiment 1: A Busbar with an Insulation Coating for a New Energy Automobile A busbar with an insulation coating for a new energy automobile comprises a busbar body and a high-temperature-resistant insulating layer sprayed on the busbar body, and a raw material formula of the high-temperature-resistant insulating layer comprises the following materials in mass percent:

| | |
|---|---|
| high aluminum cement | 11%; |
| attapulgite clay | 7%; |
| porcelain clay | 3%; |
| titanium dioxide | 3%; |
| multi-walled carbon nanotubes | 3%; |
| boron phosphate | 6%; |
| n-methylol acrylamide | 3%; |
| aluminum dihydrogen phosphate | 7%; |
| tri-block copolymer styrene-butzdiene-methyl methacrylate | 6%; |
| methylphenyl silicone resin | 3%; |
| vinyl silicone oil | 3%; |
| polyvinyl acetate emulsion | 11%; |
| deionized water | 34%. |

The organosilicon leveling agent comprises silicone oil, polydimethylsiloxane, polyether and polyester modified organic siloxane, alkyl modified organic siloxane and terminal group modified organic silicon. In the present embodiment, specifically, the silicone oil is selected.

A busbar for a new energy automobile. The thickness of the busbar is 12.5 mm; the cross-sectional area of the busbar is 38 cm³; the tensile strength, The density of the busbar is 2.7 g/cm³. The thermal conductivity of the busbar at 25° C. is 218 W/(m·K). The conductivity of the busbar is 57% IACS.

The busbar is made of aluminum. The aluminum contains 0.3%-0.4% mass fraction of Si, 0.6%-0.7% mass fraction of Fe, a total of less than or equal to 1% of other impurities, and the balance of aluminum.

Embodiment 2: A Busbar with an Insulation Coating for a New Energy Automobile

A busbar with an insulation coating for a new energy automobile comprises a busbar body and a high-temperature-resistant insulating layer sprayed on the busbar body, and a raw material formula of the high-temperature-resistant insulating layer comprises the following materials in mass percent:

| | |
|---|---|
| high aluminum cement | 5%; |
| attapulgite clay | 4%; |
| porcelain clay | 8%; |
| titanium dioxide | 5%; |
| multi-walled carbon nanotubes | 5%; |
| boron phosphate | 2%; |
| n-methylol acrylamide | 5%; |
| aluminum dihydrogen phosphate | 4%; |
| tri-block copolymer styrene-butzdiene-methyl methacrylate | 3%; |
| methylphenyl silicone resin | 6%; |
| vinyl silicone oil | 7%; |
| polyvinyl acetate emulsion | 18%; |
| deionized water | 28%. |

The organosilicon leveling agent is a mixture of the polydimethylsiloxane and the polyether and polyester modified organic siloxane in the mass ratio of 1:1.

A busbar for a new energy automobile. The thickness of the busbar is 12.5 mm; the cross-sectional area of the busbar is 38 cm$^3$. The density of the busbar is 2.7 g/cm$^3$. The thermal conductivity of the busbar at 25° C. is 218 W/(m·K). The conductivity of the busbar is 57% IACS.

The busbar is made of aluminum. The aluminum contains 0.3%-0.4% mass fraction of Si, 0.6%-0.7% mass fraction of Fe, a total of less than or equal to 1% of other impurities, and the balance of aluminum.

The above-mentioned embodiments only aim to explain the technical conception and feature of the present invention, and aim to make those skilled in the art know the content of the present invention and implement same accordingly, which cannot limit the protection scope of the present invention. Any equivalent change or modification made according to the spirit substance of the present invention shall be covered within the protection scope of the present invention.

The invention claimed is:

1. A busbar comprising:
    a busbar body and an insulating layer sprayed on the busbar body, wherein a raw material formula of the insulating layer comprises following materials in mass percent:
        high aluminum cement of 3~12%; attapulgite clay of 3~9%; porcelain clay of 3~9%; titanium dioxide of 2~5%; multi-walled carbon nanotubes of 2~6%; boron phosphate of 2~6%; n-methylol acrylamide of 2~5%; aluminum dihydrogen phosphate 3~9%; tri-block copolymer styrene-butzdiene-methyl methacrylate of 3~7%; methylphenyl silicone resin of 3~7%; vinyl silicone oil 3~7%; polyvinyl acetate emulsion 10~19%; deionized water for balance.

2. The busbar according to claim 1, having a density of 2.7 g/cm$^3$.

3. The busbar according to claim 1, having a thermal conductivity at 25° C. of 218 W/(m·K).

4. The busbar according to claim 1, having a conductivity greater than or equal to 57% IACS.

5. The busbar according to claim 1, wherein a solid content in the raw material formula of the insulating layer is less than or equal to 60%.

* * * * *